(12) United States Patent
Cao et al.

(10) Patent No.: US 12,526,630 B2
(45) Date of Patent: Jan. 13, 2026

(54) DECENTRALIZED TRUSTED ACCESS METHOD FOR CELLULAR BASE STATION

(71) Applicant: BEIJING UNIVERSITY OF POSTS AND TELECOMMUNICATIONS, Beijing (CN)

(72) Inventors: Bin Cao, Beijing (CN); Zixin Wang, Beijing (CN); Mugen Peng, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 264 days.

(21) Appl. No.: 18/281,084

(22) PCT Filed: Jan. 30, 2023

(86) PCT No.: PCT/CN2023/073754
§ 371 (c)(1),
(2) Date: Sep. 8, 2023

(87) PCT Pub. No.: WO2023/236551
PCT Pub. Date: Dec. 14, 2023

(65) Prior Publication Data
US 2025/0031040 A1 Jan. 23, 2025

(30) Foreign Application Priority Data
Jun. 6, 2022 (CN) .......................... 202210631134.8

(51) Int. Cl.
*G06F 7/04* (2006.01)
*G06F 15/16* (2006.01)
(Continued)

(52) U.S. Cl.
CPC ......... *H04W 12/08* (2013.01); *H04W 12/069* (2021.01); *H04W 12/30* (2021.01)

(58) Field of Classification Search
CPC ........................... H04W 12/08; H04W 12/069
(Continued)

(56) References Cited

U.S. PATENT DOCUMENTS

2021/0051571 A1* 2/2021 Xu .................. H04W 72/04

FOREIGN PATENT DOCUMENTS

| CN | 108462963 A | 8/2018 |
|---|---|---|
| CN | 111246474 A | 6/2020 |

(Continued)

OTHER PUBLICATIONS

International Search Report, mailed Mar. 22, 2023, for International Application No. PCT/CN2023/073754. (6 pages).
(Continued)

*Primary Examiner* — Jeffrey C Pwu
*Assistant Examiner* — Samuel Ambaye
(74) *Attorney, Agent, or Firm* — RowanTree Law Group, PLLC; Frederick F. Rosenberger

(57) ABSTRACT

The present disclosure belongs to the field of communications and more particularly relates to a decentralized trusted access method for a cellular base station. The method includes: uploading registration information to a blockchain network to add the cellular base station as a member to the blockchain network; uploading a master information block to the blockchain network, receiving block identification information from the blockchain network; broadcasting the master information block and the block identification information to cellular users within the coverage area; receiving an access request from the cellular user, and in response to the access request, performing uplink synchronization with the cellular user issuing the access request based on a random access procedure.

8 Claims, 5 Drawing Sheets

(51) Int. Cl.
 *H04L 29/06* (2006.01)
 *H04W 12/069* (2021.01)
 *H04W 12/08* (2021.01)
 *H04W 12/30* (2021.01)
(58) Field of Classification Search
 USPC .......................................................... 726/4
 See application file for complete search history.

(56) References Cited

FOREIGN PATENT DOCUMENTS

| | | | |
|---|---|---|---|
| CN | 115038084 A | 9/2022 | |
| EP | 3579494 A1 * | 12/2019 | .............. H04W 8/12 |
| WO | 2019/047631 A1 | 3/2019 | |

OTHER PUBLICATIONS

Written Opinion, mailed Mar. 22, 2023, for International Application No. PCT/CN2023/073754. (6 pages).

Hojjati et al., "A Blockchain-Based Authentication and Key Agreement (AKA) Protocol for 5G Networks," IEEE Access, Dec. 2020, 8: pp. 216461-216476. (16 pages).

* cited by examiner

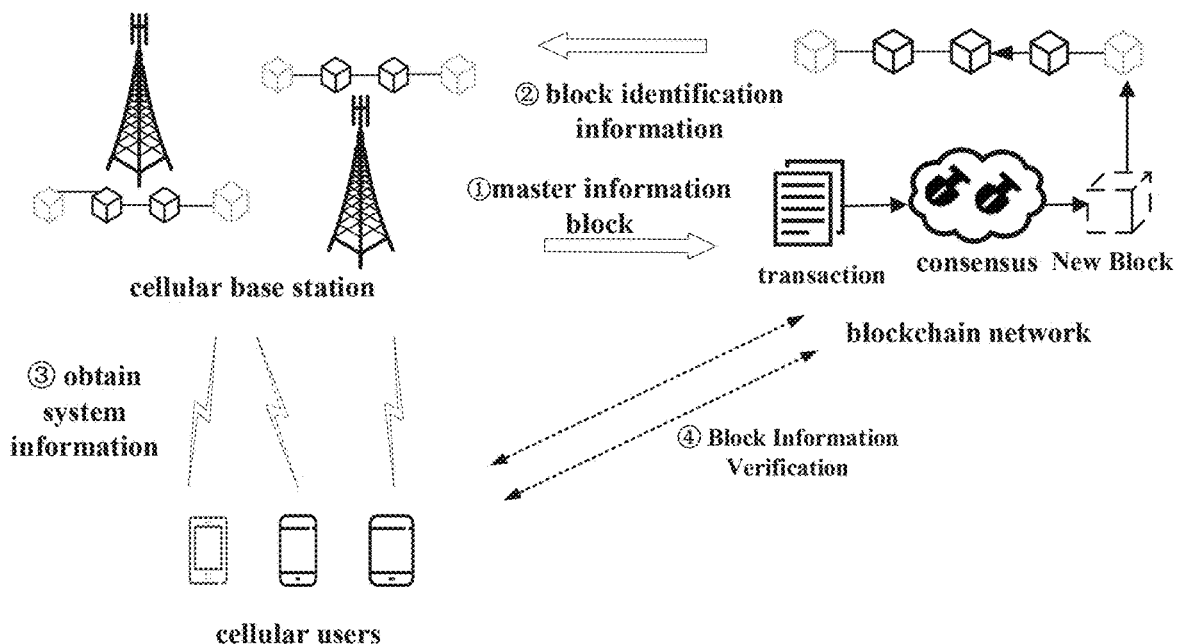

FIG. 1

```
┌─────────────────────────────────────────────────────────────────┐
│ uploading registration information to a blockchain network, the│ 101
│ registration information comprises a public key pair and a    │
│ certificate of the cellular base station; and based on         │
│ the public key pair and the certificate, adding the cellular base station as a member to │
│ the blockchain network                                         │
└─────────────────────────────────────────────────────────────────┘
                              ↓
┌─────────────────────────────────────────────────────────────────┐
│ uploading a master information block to the blockchain network, the master information │ 102
│ block is used to indicate basic information required for cellular users within a coverage │
│ area of the cellular base station to access the cellular base station │
└─────────────────────────────────────────────────────────────────┘
                              ↓
┌─────────────────────────────────────────────────────────────────┐
│ receiving block identification information from the blockchain network, the block │ 103
│ identification information is generated by executing a consensus algorithm on the block, │
│ and after satisfying consensus algorithm conditions, storing the block on the chain; the │
│ block is a data block formed by packaging after authenticating the master information │
│ block by the blockchain network                                │
└─────────────────────────────────────────────────────────────────┘
                              ↓
┌─────────────────────────────────────────────────────────────────┐
│ broadcasting the master information block and the block identification information to │ 104
│ cellular users within the coverage area                        │
└─────────────────────────────────────────────────────────────────┘
                              ↓
┌─────────────────────────────────────────────────────────────────┐
│ receiving an access request from the cellular user, the access request comprises the │ 105
│ cellular base station to be accessed as determined by the cellular user based on the │
│ master information block and the block identification information │
└─────────────────────────────────────────────────────────────────┘
                              ↓
┌─────────────────────────────────────────────────────────────────┐
│ in response to the access request, performing uplink synchronization with the cellular │ 106
│ user issuing the access request based on a random access procedure │
└─────────────────────────────────────────────────────────────────┘
```

FIG. 2

DECENTRALIZED TRUSTED ACCESS METHOD FOR CELLULAR BASE STATION

TECHNICAL FIELD

The present disclosure belongs to the field of communications, and more particularly, relates to a decentralized trusted access method for a cellular base station.

BACKGROUND

Among the many attack behaviors in 5G mobile network communication, false base station attacks are a typical attack method. Attackers often disguise themselves as legitimate operator base stations, send signals to nearby target mobile devices or force users to access the base station according to relevant protocols, in order to achieve network fraud, privacy information acquisition and other purposes. Although methods such as mutual authentication and 5G Subscription Permanent Identifier can reduce the impact of false base stations to a certain extent, the transmission information between users and cellular base stations is directly exposed to the wireless environment before completing the bidirectional authentication and security mode encryption steps. Especially, the non-encrypted broadcast of system information, which is the basic information for users to access the base station, is an important issue.

In TR 33.809, 3GPP proposes several solutions based on encryption algorithms for protecting system information, including solutions based on digital signatures, certificates, and identity. The above three solutions have the following problems: 1) For the encryption scheme based on digital signatures, facing the emerging multi-party governance and decentralized wireless networks (such as the Internet of Things, edge computing, and industrial Internet), key management lacks unified trust transmission, that is, there is a problem of mutual distrust between different suppliers in key management; 2) For the encryption scheme based on certificates, since the root certificate is written into the user terminal during the production stage, the operator cannot update and revoke old root certificates in a timely manner; 3) For the encryption scheme based on identity, users must trust an authorized third party, which generates and manages user keys, and when the third party fails, there is a single point of failure risk in system information encryption.

Blockchain, as an emerging technology, has unique characteristics of decentralization and immutability, which can establish trust between independent network entities, enhance secure interaction between network participants, and provide a new distributed security protection method for system information. The system information protection scheme based on blockchain does not require the help of any authorized third party, but it still has the functions and advantages of cryptography, which can effectively solve the difficulties faced by the centralized management scheme based on cryptography. However, although many researchers are committed to exploring the application mode of blockchain network in radio access network, most of them focus on resource allocation and multi-party cooperation, and still lack a matching mechanism between blockchain and wireless access process in the field of system information security protection, as well as an analysis scheme for improving the energy efficiency of blockchain-based system information security protection.

SUMMARY

In response to the threats of false base station attacks brought by the non-encrypted broadcasting of 5G R16 version system information, as well as the single-point failure risks and performance limitations associated with centralized encryption and security protection modes that rely on core network-assisted verification, the present disclosure aims to utilize the distributed, decentralized, network-wide consensus, and tamper-proof characteristics of blockchain technology to provide a decentralized trusted access method for a cellular base station, in order to achieve the following objectives: 1) ensuring the authenticity, effectiveness, and non-tampering of the broadcasted system information from a base station in a decentralized trust-lacking environment by utilizing network-wide consensus, thereby enhancing the security of system information; 2) endowing cellular users with the ability to resist attacks such as tampering and replay when false base stations capture system information; and 3) enabling cellular users to verify the authenticity, reliability, and freshness of system information during the initial access stage, freeing them from the dependence on core network-assisted verification.

Based on the technical objectives as above, in a first aspect of the present disclosure, the present disclosure provides a decentralized trusted access method for a cellular base station, which is applied to the cellular base station, the method includes:

uploading registration information to a blockchain network, wherein the registration information comprises a public key pair and a certificate of the cellular base station; and based on the public key pair and the certificate, adding the cellular base station as a member to the blockchain network;

uploading a master information block to the blockchain network, wherein the master information block is used to indicate basic information required for cellular users within a coverage area of the cellular base station to access the cellular base station;

receiving block identification information from the blockchain network, wherein the block identification information is generated by executing a consensus algorithm on a block, and after satisfying consensus algorithm conditions, storing the block on the chain; the block is a data block formed by packaging after authenticating the master information block by the blockchain network;

broadcasting the master information block and the block identification information to cellular users within the coverage area;

receiving an access request from the cellular user, wherein the access request comprises the cellular base station to be accessed as determined by the cellular user based on the master information block and the block identification information; and in response to the access request, performing uplink synchronization with the cellular user issuing the access request based on a random access procedure.

In a second aspect of the present disclosure, the present disclosure provides a decentralized trusted access method for a cellular base station, which is applied to a blockchain network, the method includes:

receiving registration information uploaded by the cellular base station, wherein the registration information comprises a public key pair and a certificate of the cellular base station;

in response to the public key pair and the certificate, performing registration processing for the cellular base station to add the cellular base station as a member to the blockchain network;

receiving master information block uploaded by the cellular base station, the master information block is used to indicate the basic information required for cellular users within a coverage area of the cellular base station to access the cellular base station;

in response to the master information block, forming a block by packaging after authenticating the master information block; executing a consensus algorithm on the block, after satisfying consensus algorithm conditions, storing the block on the chain and generating block identification information; and returning the block identification information to the cellular base station for the cellular base station to broadcast the master information block and the block identification information to cellular users within the coverage area, allowing the cellular users within the coverage area to determine the cellular base station to be accessed based on the master information block and the block identification information, and performing uplink synchronization with the cellular base station to be accessed based on a random access procedure.

In a third aspect of the present disclosure, the present disclosure provides a decentralized trusted access method for a cellular base station, which is applied to a cellular user, the method includes:

acquiring a master information block and block identification information broadcast by the cellular base station, and verifying the block identification information; the master information block is used to indicate the basic information required for cellular users within a coverage area of the cellular base station to access the cellular base station; the block identification information is generated by executing a consensus algorithm on a block, and after satisfying consensus algorithm conditions, storing the block on the chain; the block is a data block formed by packaging after authenticating the master information block by the blockchain network;

if the block identification information exists, verifying the block identification information, if the verification of the block identification information is successful, continuing to verify the block corresponding to the block identification information, if the verification of the block is successful, determining the cellular base station as the base station to be accessed; and performing uplink synchronization with the cellular base station to be accessed based on a random access procedure.

In a fourth aspect of the present disclosure, the present disclosure provides a decentralized trusted access method for a cellular base station, which is applied to the first aspect, the second aspect, or/and the third aspect of the present disclosure, the method further includes: defining a probability of the cellular user determining a false base station as a cellular base station to be accessed as an access failure probability; calculating the access failure probability of the cellular user; comparing the calculated access failure probability with a pre-calculated access failure probability, and calculating a security gain of the blockchain network; deploying a block threshold of the blockchain network based on the security gain, and updating the verification threshold of the block depth in the blockchain network.

The beneficial effects of the present disclosure are as follows: based on the decentralized tamper-proof characteristics of the blockchain network, the present disclosure designs a system information security protection scheme, the blockchain network verifies and stores the master information block broadcasted by legitimate base stations, thereby overcoming the security risks of existing non-encrypted broadcasting and the single-point failure risks of centralized encryption schemes, reducing the threat of tampering, enhancing system security performance, and enabling cellular users to verify the reliability of the system during the initial access stage.

BRIEF DESCRIPTION OF THE DRAWINGS

FIG. 1 is a schematic diagram of the decentralized trusted access architecture for a cellular base station in an embodiment of the present disclosure;

FIG. 2 is a flowchart of the decentralized trusted access method for a cellular base station in one embodiment of the present disclosure;

DETAILED DESCRIPTION

Figure 3:
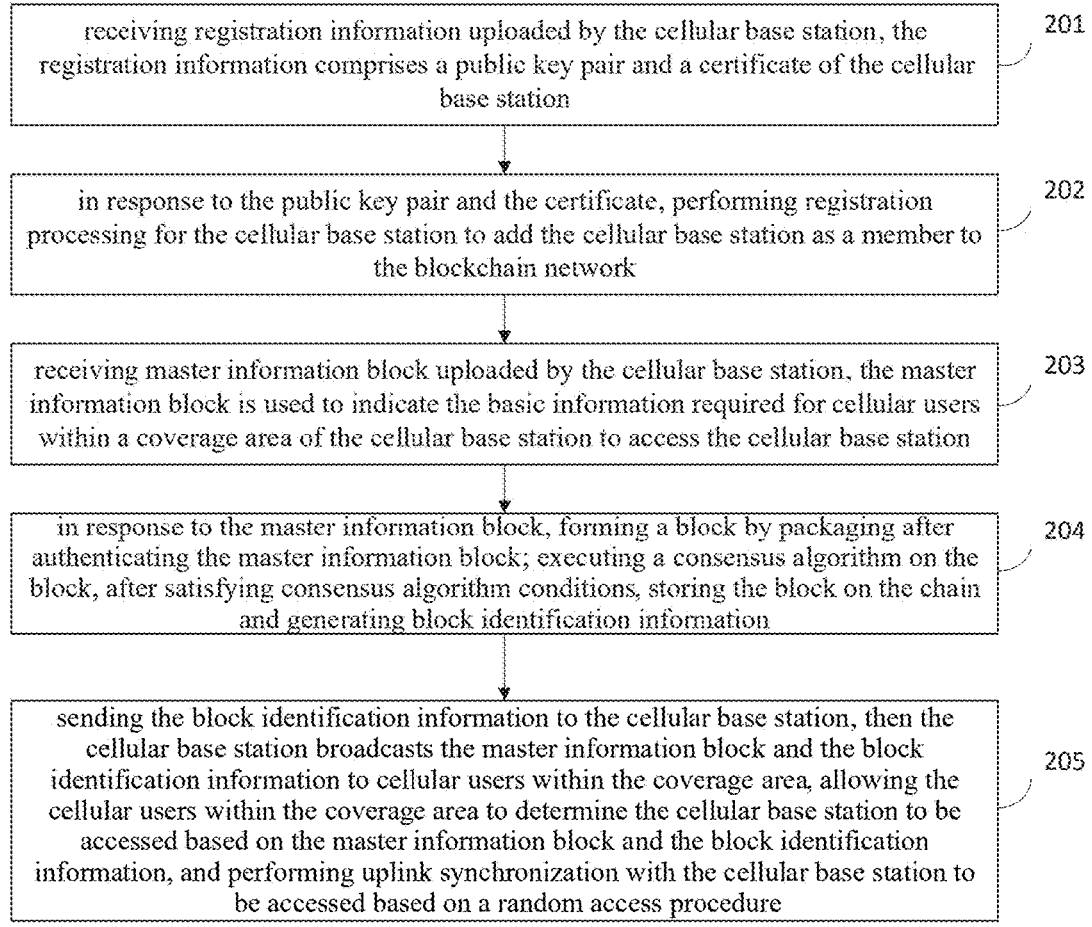
FIG. 3 is a flowchart of the decentralized trusted access method for a cellular base station in another embodiment of the present disclosure.

The following will provide a clear and complete description of the technical solutions in the embodiments of the present disclosure in conjunction with the accompanying drawings. Apparently, the described embodiments are only a part of the embodiments of the present disclosure. All other embodiments obtained by those skilled in the art without making inventive efforts are within the scope of protection of the present disclosure.

To facilitate understanding of the method provided by the present disclosure, an explanation of the terms involved in the present disclosure is provided:

System Information: According to the standardized technical specification TS 38.331 released by the 3rd Generation Partnership Project (3GPP), system information consists of a Master Information Block (MIB) and a series of System Information Blocks (SIB), which can be divided into minimum system information and other system information. Minimum system information includes the MIB and SIB1, which are usually broadcast periodically by cellular base station nodes. Other system information can be sent or broadcast periodically according to user terminal requirements.

System information broadcasting is the first step for user terminals to obtain basic service information. Through the system information broadcasting process, user terminals can obtain the basic information required for accessing the cellular network, especially the MIB in the minimum system information, which contains the most basic information for users to access the cell and guidance information for SIB1, playing an important role in the user's initial access process. Therefore, the embodiment of the present disclosure designs a trusted access method based on blockchain technology to protect the transmission of the MIB in the minimum system information.

Blockchain: a blockchain is composed of an increasing number of blocks, which are authorized by a consensus mechanism and connected by cryptographic algorithms to form a chain. Each block securely records a certain number of transactions, and each block is hashed by including metadata about the hash value of the previous block. A change in one block will cause changes in all subsequent blocks in the chain, making it possible to protect the data contained in the blocks from being modified.

Since the nature of the blockchain is a distributed system, the security and efficiency of the blockchain are maintained through a consensus mechanism, solving the coordination problem of how to reach consensus among multiple nodes. Blocks approved by the consensus mechanism can be added to the blockchain as new blocks, where the blockchain selects the longest chain as the valid chain according to the "longest chain" principle. The present disclosure introduces blockchain into trusted secure access based on this principle.

Merkle Tree: blockchain uses Merkle trees for data storage. A Merkle tree is a tree structure in which leaf nodes store transaction data, non-leaf nodes store the hash values of their child nodes, and new hash nodes are generated layer by layer, eventually storing the Merkle tree root in the block header information. Therefore, any changes in the underlying data will cause the Merkle tree root to change, allowing the integrity of the entire block body to be judged by comparing the Merkle tree root in the block header information and quickly locating it based on the hash path.

FIG. 1 is a schematic diagram of a decentralized trusted access architecture for a cellular base station in the embodiments of the present disclosure. As shown in FIG. 1, the present disclosure mainly includes two types of entities, including cellular base stations and cellular users. The cellular base stations and cellular users are connected through a wireless network, and the cellular base stations interact with the blockchain network as blockchain members. During the process of cellular users accessing the cellular base stations, the base stations will upload the MIB to the blockchain network. The blockchain network will process the MIB as transaction information, generate a new block, and after consensus, this new block will be stored on the chain and generate block identification information, which corresponds to the block. The cellular base station will broadcast the MIB and block identification information to all cellular users within its coverage area. Cellular users will verify the obtained MIB and block identification information, and after a successful verification, the cellular users can obtain specific system information from the block corresponding to the block identification information and establish an initial connection with the cellular base station.

FIG. 2 is a flowchart of a decentralized trusted access method for a cellular base station in the first embodiment of the present disclosure. As shown in FIG. 2, the method is applied to cellular base stations and includes:

at 101, uploading registration information to a blockchain network, the registration information comprises a public key pair and a certificate of the cellular base station; and based on the public key pair and the certificate, adding the cellular base station as a member to the blockchain network;

In the embodiments of the present disclosure, the cellular base station will initiate a registration request to the blockchain network, requesting to join the blockchain network as a member node. By uploading registration information to the blockchain network, the blockchain network will complete the registration of the cellular base station based on the registration information. The registration information includes the public key pair and the certificate of the cellular base station, which can be provided in advance by the equipment manufacturer and pre-installed with a public key certificate signed by the equipment manufacturer.

For example, the cellular base station uploads its public key pair and certificate to the blockchain network for registration. The blockchain network verifies the registration request of the cellular base station based on the root certificate. The certificate authentication mechanism can adopt the authentication authority certificate mechanism based on 3GPP 33.310 (R17 version) to solve the trust issue of the blockchain node's subject identity. The cellular base station initiates a registration request to the blockchain network, and the blockchain network verifies the base station's identity based on the equipment manufacturer's root certificate and signed certificate. If the verification is successful, the blockchain network issues a registration certificate to the cellular base station and returns a certificate response. The cellular base station replaces the pre-registration certificate with the registration certificate, completing the base station registration.

It should be understood that the cellular base station joins the blockchain network as a member node, and the member node can include client nodes and computing nodes. In other words, the cellular base station can act as a client node or a computing node in the blockchain network. When the cellular base station acts as a computing node, it helps maintain the blockchain network together, which means it can perform traditional computing functions, including but not limited to packaging blocks and verification. When the cellular base station acts as a client node, these client nodes send MIB to the blockchain network in the form of transactions. In the blockchain network, at the same time, some cellular base stations act as computing nodes, while others act as client nodes, jointly maintaining the operation of the entire blockchain network to achieve the purpose of cellular user access.

at 102, uploading a master information block to the blockchain network, the master information block is used to indicate basic information required for cellular users within a coverage area of the cellular base station to access the cellular base station;

In the embodiments of the present disclosure, after the cellular base station registers with the blockchain network, it is eligible to act as a blockchain member to verify the MIB uploaded to the blockchain network. The MIB includes the decoding information of SIB1, and SIB1 contains the scheduling information of other system information (OSI). Therefore, the MIB can be used to indicate the basic information required for cellular users within the coverage area of the cellular base station to access the cellular base station.

In the embodiments of the present disclosure, in order to reduce the overhead of request authentication, the cellular base station is not allowed to send requests repeatedly within a certain period. The request transaction information can include the following parts: {MIB, Cell_ID, Downlink_Frequency, Time_Counter}. The transaction information can be changed according to the actual scenario and system security evolution requirements.

at 103, receiving block identification information from the blockchain network, the block identification information is generated by executing a consensus algorithm on the block, and after satisfying consensus algorithm conditions, storing the block on the chain; the block is a data block formed by packaging after authenticating the master information block by the blockchain network;

In the embodiments of the present disclosure, the cellular base station receives the block identification information corresponding to the MIB uploaded by the cellular base station. The block identification information corresponds one-to-one with the blocks in the blockchain network, that is, the block identification information can identify the corresponding block in the blockchain network. For example, suppose the block identification information is 000000000019d6689c, then this block identification information 000000000019d6689c can identify a unique block in the blockchain network. Therefore, the cellular base station only needs to follow the block identification information to obtain the corresponding block, ensuring the information security of each cellular base station and its corresponding cellular users.

In the embodiments of the present disclosure, the base station publishes transaction information containing system information to the blockchain network for consensus verification. When the blockchain network reaches a consensus, a new block containing the system information will be added to the blockchain network. The consensus mechanism is optional, and this embodiment uses Proof of Work (PoW) as an example:

The base station publishes transaction information containing system information to the blockchain transaction pool, and consensus nodes verify its validity and integrity. Then, the consensus nodes select transactions to be packaged into blocks according to the publishing order, using a Merkle tree to summarize all transactions and obtain the Merkle root. The nodes continuously modify the random number and calculate the hash value of the block header information until they find a random number value that meets the conditions. When a mining node successfully finds a solution, it fills the random number field in the block header information. The block is then added to the local ledger and broadcast to peers, once other blockchain miners verify that it is a valid block, they will also perform this operation. Afterward, the base station broadcasts the block header information of the new block and the Merkle verification path of the transaction containing the MIB, forming the block identification information. Due to the limitations of physical channel encoding, the new block proof can be placed in new_SIB and broadcast together with SIB1. In addition, new_SIB guide information is also stored in SIB1.

at 104, broadcasting the master information block and the block identification information to cellular users within the coverage area;

In the embodiments of the present disclosure, the cellular base station broadcasts the received MIB and block identification information from the blockchain network to cellular users within its coverage area, which can be broadcast periodically. The purpose of broadcasting is to allow cellular users to obtain basic service information. The MIB contained in the block corresponding to the block identification information is based on the tamper-proof nature of the blockchain, which can prevent malicious modification, improve system security performance, and enable cellular users to verify the reliability of the system during the initial access stage.

at 105, receiving an access request from the cellular user, the access request comprises the cellular base station to be accessed as determined by the cellular user based on the master information block and the block identification information;

In the embodiments of the present disclosure, the cellular users send access requests to the cellular base station they have determined to access. Since the access request has a specific nature, the access request determines the target initiated by the cellular user. Therefore, once the cellular base station receives the access request, it indicates that the cellular base station receiving the access request is the cellular base station to be accessed as determined by the cellular user.

In this case, the cellular user determines the cellular base station to be accessed based on the master information block and the block identification information, specifically including:

The cellular user verifies the block identification information received from the broadcast of the cellular base station. If the block identification information exists, the verification of the received block identification information from the broadcast of the cellular base station continues. If the block identification information passes verification, the corresponding block of the block identification information is further verified. If the following conditions are met simultaneously, the cellular base station broadcasting the block is determined to be the cellular base station to be accessed; the conditions are as follows:

The timestamp in the block identification information is legitimate, or the timestamp of the block is legitimate; the Merkle tree root calculated from the block identification information is consistent with the Merkle tree root stored in the blockchain network; and the block depth of the block corresponding to the block identification information is not less than the verification threshold.

Among the above three conditions, only one of the timestamps of the block identification information or the block needs to be legitimate. The Merkle tree root calculated from the block identification information must be consistent with the Merkle tree root stored in the blockchain network, and the block depth of the block must not be less than the verification threshold. After these conditions are met, it indicates that the block identification information has passed verification, and the block has also passed verification. The cellular base station corresponding to the verified block and block identification information is the cellular base station to be accessed.

Based on the above judgment factors, the validity, existence, and security of the master information block corresponding to the block identification information can be ensured.

At 106, in response to the access request, performing uplink synchronization with the cellular user issuing the access request based on a random access procedure.

In the embodiments of the present disclosure, after the cellular user obtains the corresponding physical cell identifier, the MIB, and the corresponding block identification information, the cellular user detects the physical downlink shared channel according to the information in the MIB to obtain SIB1, and further acquires other system information and random access information required by the terminal.

Therefore, in the present disclosure, the cellular base station that receives the access request from the cellular user is also the cellular base station to be accessed by the cellular user. The cellular base station responds to the access request and performs uplink synchronization with the cellular user who issued the access request based on the random access procedure. The process of trusted access in the present disclosure includes:

The cellular user obtains the cell identifier, the master information block, and verifies the blockchain identification information. The cellular user verifies the master information block based on the blockchain identification information. The cellular user performs downlink synchronization.

The cellular user obtains the time-frequency domain position of SIB1. The cellular user obtains the required random access information from SIB1. The cellular user executes the random access procedure through the uplink. The cellular user and the cellular base station carry out subsequent initial access procedures.

In one or more embodiments of the present disclosure, the cellular user who issues the access request can obtain random access procedure information (such as uplink frequency and physical random channel configuration) through SIB1 and implement uplink synchronization through the random access procedure. Subsequently, the initial registration process is initiated. In the current R16 version protocol, considering the standalone networking scenario targeted in this embodiment, a two-step random access scheme can be adopted. The first step includes uplink MSGA transmission, which contains a preamble and payload, and requires sending the MsgA preamble first, followed by the MsgA payload. The second step of the two-step random access is downlink MSGB transmission (sent from the base station to the user), which includes MsgB PDCCH and MsgB PDSCH. If MsgB is not received within the MsgB Response Window, MsgA is retransmitted.

FIG. 3 is a flowchart of a decentralized trusted access method for a cellular base station in another embodiment of the present disclosure. As shown in FIG. 3, the method is applied to a blockchain network and includes:

At 201, receiving registration information uploaded by the cellular base station, the registration information comprises a public key pair and a certificate of the cellular base station.

In the embodiments of the present disclosure, the cellular base station initiates a registration request to the blockchain network, requesting to join the blockchain network as a member node. The cellular base station uploads registration information to the blockchain network. After receiving the registration information, the blockchain network completes the registration of the cellular base station based on the registration information. The registration information includes the public key pair and certificate of the cellular base station, which can be provided in advance by the equipment vendor and pre-installed with a public key certificate signed by the equipment vendor.

At 202, in response to the public key pair and the certificate, performing registration processing for the cellular base station to add the cellular base station as a member to the blockchain network.

In the embodiments of the present disclosure, the blockchain network responds to the registration information uploaded by the cellular base station and registers the cellular base station in the blockchain network based on the registration information. The registration information of the cellular base station can be verified according to the root certificate. If the verification is successful, the cellular base station is added as a member to the blockchain network; otherwise, the cellular base station is denied membership in the blockchain network.

The base station is pre-provided with a public key pair by the supplier and pre-installed with a public key certificate signed by the supplier. The base station uploads its public key pair and certificate to the blockchain network for registration. The blockchain network verifies the base station's registration request based on the root certificate. The certificate authentication mechanism can adopt the authentication authority certificate mechanism based on 3GPP 33.310 (R17 version) to solve the trust issue of the blockchain node's principal identity. The base station initiates a registration request to the blockchain network, and the blockchain network verifies the base station's identity based on the equipment vendor's root certificate and signed certificate. If the verification is successful, the blockchain network issues a registration certificate to the base station and returns the corresponding certificate response. The base station's certificate is replaced with the registration certificate, completing the base station registration.

At 203, receiving master information block uploaded by the cellular base station, the master information block is used to indicate the basic information required for cellular users within a coverage area of the cellular base station to access the cellular base station.

In the embodiments of the present disclosure, the blockchain network can periodically or in real-time receive the master information block uploaded by the cellular base station. The master information block MIB includes the decoding information of SIB1, and SIB1 contains the scheduling information of other system information. Therefore, the master information block can be used to indicate the basic information required for cellular users within the coverage area of the cellular base station to access the cellular base station.

At 204, in response to the master information block, forming a block by packaging after authenticating the master information block; executing a consensus algorithm on the block, after satisfying consensus algorithm conditions, storing the block on the chain and generating block identification information;

In the embodiments of the present disclosure, the blockchain network responds to the master information block received from the cellular base station, authenticates the master information block in response to the master information block, and packages it into a block if the authentication is successful, otherwise discards it. The block containing the authenticated master information block executes a consensus algorithm, such as PoW or DAG, etc. When the nodes in the blockchain network reach a consensus, the block is stored on the chain, and block identification information is generated for the block.

It can be understood that the consensus algorithm executed on the block of the master information block in the embodiments of the present disclosure can be any consensus algorithm existing in the prior art, as long as it can complete the consensus on the block, and the present disclosure does not specifically limit this.

At 205, sending the block identification information to the cellular base station for the cellular base station to broadcast the master information block and the block identification information to cellular users within the coverage area, allowing the cellular users within the coverage area to determine the cellular base station to be accessed based on the master information block and the block identification information, and performing uplink synchronization with the cellular base station to be accessed based on a random access procedure.

In the embodiments of the present disclosure, the blockchain network sends the corresponding block identification information to the cellular base station, and the cellular base station also broadcasts the master information block and the block identification information to the cellular users within its coverage area; the cellular users calculate the cellular base station to be accessed based on the received master information block and block identification information. After determining the cellular base station to be accessed, the cellular user sends an access request to the cellular base station to be accessed, and the cellular base station to be accessed responds to the access request such that the cellular user establishes uplink synchronization with the cellular base station to be accessed based on the random access procedure.

Figure 4:
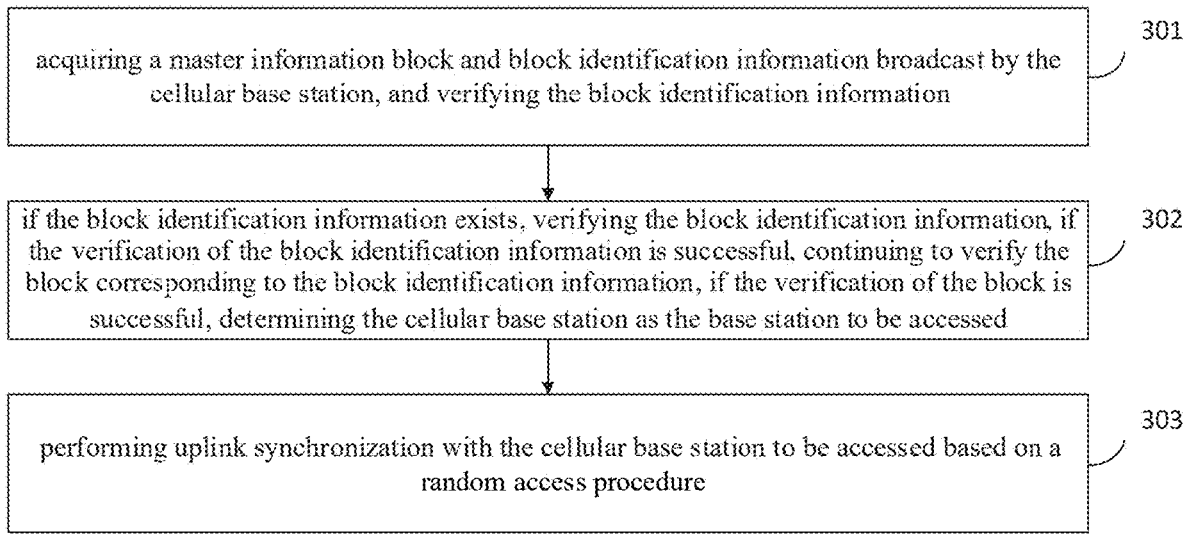
FIG. 4 is a flowchart of the decentralized trusted access method for a cellular base station in yet another embodiment of the present disclosure.

FIG. 4 is a flowchart of a decentralized trusted access method for a cellular base station in another embodiment of the present disclosure; as shown in FIG. 4, the method is applied to cellular users and includes:

At 301, acquiring a master information block and block identification information broadcast by the cellular base station, and verifying the block identification information;

In the embodiments of the present disclosure, the master information block is used to indicate the basic information required for cellular users within the coverage area of the cellular base station to access the cellular base station; the block identification information broadcasted by the cellular base station is sent by the blockchain network to the registered cellular base station, and the block identification information is generated by executing a consensus algorithm on the block, and storing the block on the chain after satisfying the consensus algorithm conditions; and the block is a data block formed by the blockchain network after authenticating the master information block;

At 302, if the verification of the block identification information is successful, continuing to verify the block, and if the verification of the block is successful, determining the cellular base station as the base station to be accessed;

In the embodiments of the present disclosure, the cellular user first verifies the block identification information; if the block identification information exists, continue to verify the block identification information; if the verification is successful, continue to verify the block; and if the following conditions are met simultaneously, determine the cellular base station broadcasting the block identification information corresponding to the block as the one to be accessed;

During the process of verifying the block identification information, if the verification of the block identification information is successful, continuing to verify the block corresponding to the block identification information, verification conditions used include:

Verifying if the first Merkle tree root calculated by the block identification information is consistent with the second Merkle tree root in the stored block in the blockchain network; verifying if a timestamp of the block identification information is legitimate, or if a timestamp of the block corresponding to the block identification information is legitimate; and verifying if a block depth of the block corresponding to the block identification information is not less than a verification threshold.

In the embodiments of the present disclosure, verifying if the first Merkle tree root calculated by the block identification information is consistent with the second Merkle tree root in the stored block in the blockchain network includes:

Obtaining a Merkle path and block header information from the block identification information; calculating a hash value of the master information block and calculating the first Merkle tree root based on the hash value of the master information block and the Merkle path; synchronizing a main chain block header information and searching the block header information corresponding to the block identification information in the synchronized main chain block header information; obtaining the second Merkle tree root through the saved main chain block header information; and comparing the first Merkle tree root with the second Merkle tree root, and if they are not consistent, marking the cellular base station broadcasting the block identification information as a malicious cellular base station.

It should be understood that in the embodiments of the present disclosure, it is only necessary to determine whether the timestamp of the block identification information or the timestamp of the block is legitimate, and it is not necessary to determine whether both the timestamp of the block identification information and the timestamp of the block are legitimate simultaneously; when only determining whether the timestamp of the block identification information is legitimate, it is necessary to verify the legality of the timestamp of the block identification information before determining whether the block depth of the block corresponding to the block identification information is not less than the verification threshold, that is, the order of determining the legality of the timestamp of the block identification information and the Merkle tree root of the block identification information can be exchanged, and when both pass the verification simultaneously, it indicates that the verification of the block identification information is successful, and then the block corresponding to the block identification information is verified; when only determining whether the timestamp of the block is legitimate, it is necessary to verify the legality of the timestamp of the block after verifying that the first Merkle tree root calculated from the block identification information is consistent with the second Merkle tree root in the stored block in the blockchain network, that is, the order of determining the legality of the timestamp of the block and the block depth of the block can be exchanged, and when the first Merkle tree root calculated from the block identification information is consistent with the second Merkle tree root in the stored block in the blockchain network, it indicates that the verification of the block identification information is successful, and then the block corresponding to the block identification information is verified, so that the verification method can be flexibly applied to different scenarios. In this case, whether the timestamp of the block identification information or the timestamp of the block is illegitimate, it indicates that the cellular base station broadcasting the block identification information is an invalid cellular base station.

In the embodiments of the present disclosure, verifying if the block depth of the block corresponding to the block identification information is not less than the verification threshold includes: if the block depth of the block being less than the verification threshold, marking the cellular base station broadcasting the block identification information as a malicious invalid base station; and if the block depth of the block being not less than the verification threshold, marking the cellular base station broadcasting the block identification information as a base station to be accessed.

In some embodiments, for the verification process used to determine whether the following conditions are met simultaneously, the embodiments of the present disclosure can adopt the following process:

Verify whether the timestamp of the block identification information is legitimate; if the timestamp of the block identification information is legitimate, continue to verify whether the first Merkle tree root calculated from the block identification information is consistent with the second Merkle tree root in the stored block in the blockchain network; if the timestamp of the block identification information is illegitimate, the block identification information verification fails, determine that the cellular base station corresponding to the failed verification block identification information is not a cellular base station to be accessed, and end the verification; if the first Merkle tree root and the second Merkle tree root are consistent, the block identification information verification passes, continue to verify whether the block depth of the block corresponding to the passed verification block identification information is not less than the verification threshold; if the first Merkle tree root and the second Merkle tree root are inconsistent, the block identification information verification fails, determine that the cellular base station corresponding to the failed verification block identification information is not a cellular base station to be accessed, and end the verification; if the block depth of the block is not less than the verification threshold, the block verification passes, and determine that the cellular base station corresponding to the passed verification block is a cellular base station to be accessed; and if the block depth of the block is less than the verification threshold, the block verification fails, determine that the cellular base station corresponding to the failed verification block is not a cellular base station to be accessed, and end the verification;

In other embodiments, for the verification process used to determine whether the following conditions are met simultaneously, the embodiments of the present disclosure can adopt the following process:

Verify whether the first Merkle tree root calculated from the block identification information is consistent with the second Merkle tree root in the stored block in the blockchain network; if the first Merkle tree root and the second Merkle tree root are consistent, continue to verify whether the timestamp of the block identification information is legitimate; if the first Merkle tree root and the second Merkle tree root are inconsistent, the block identification information verification fails, determine that the cellular base station corresponding to the failed verification block identification information is not a cellular base station to be accessed, and end the verification; if the timestamp of the block identification information is legitimate, the block identification information verification passes, continue to verify whether the block depth of the block corresponding to the passed verification block identification information is not less than the verification threshold; if the timestamp of the block identification information is illegitimate, the block identification information verification fails, determine that the cellular base station corresponding to the failed verification block identification information is not a cellular base station to be accessed, and end the verification; if the block depth of the block is not less than the verification threshold, the block verification passes, and determine that the cellular base station corresponding to the passed verification block is a cellular base station to be accessed; and if the block depth of the block is less than the verification threshold, the block verification fails, determine that the cellular base station corresponding to the failed verification block is not a cellular base station to be accessed, and end the verification.

It can be understood that in the embodiments of the present disclosure, the core of verifying whether the following conditions are met simultaneously lies in first determining whether the block identification information can be verified. If the block identification information can be verified, the block corresponding to the verified block identification information will be verified next. Since the block identification information and the block are uniquely corresponding, a unique corresponding block can be determined based on the block identification information. If the uniquely corresponding block of the block identification information is also verified, since each cellular base station will only obtain the block identification information corresponding to the master information block of this cellular base station from the blockchain network, one block identification information can only correspond to one cellular base station, indicating that the cellular base station broadcasting the block identification information is a cellular base station to be accessed.

Figure 5:
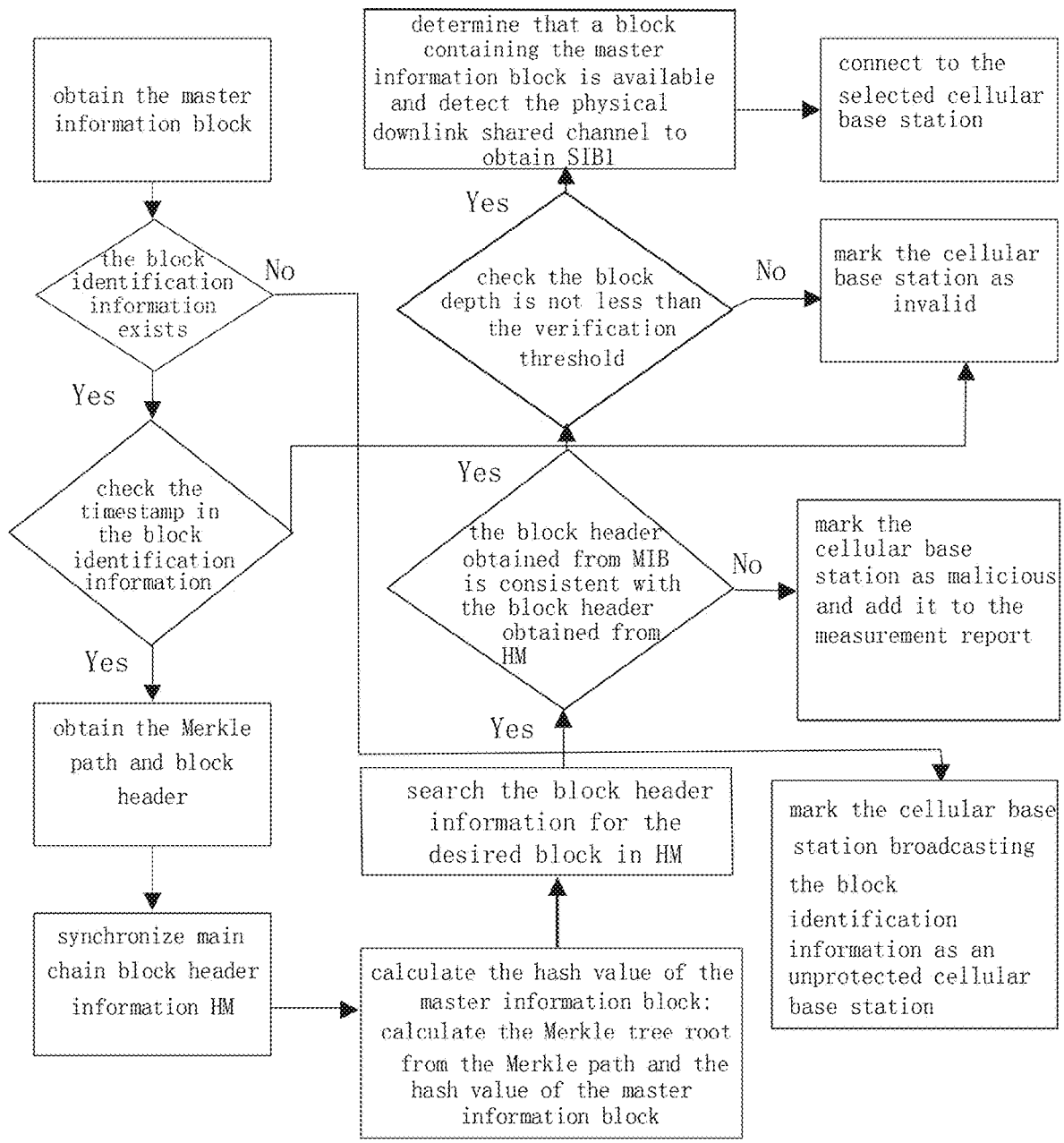
FIG. 5 is a flowchart of the verification process for determining the cellular base station to be accessed in an embodiment of the present disclosure.

In one or more embodiments of the present disclosure, as shown in FIG. 5, the process of the cellular user verifying the block identification information can include:

After obtaining the master information block, first determine whether the block identification information exists; if the block identification information does not exist, mark the cellular base station broadcasting the block identification information as an unprotected cellular base station; if the block identification information exists, continue to verify the block identification information; check the timestamp corresponding to the block identification information, if the timestamp is illegitimate, mark the cellular base station broadcasting the block identification information as an invalid cellular base station, if the timestamp is legitimate, obtain the Merkle path and block header information from the block identification information; calculate the hash value of the master information block, and calculate the first Merkle tree root based on the hash value of the master information block and the Merkle path; synchronize the main chain block header information and search for the block header information corresponding to the block identification information in the synchronized main chain block header information; if the calculated first Merkle tree root is inconsistent with the second Merkle tree root in the saved main chain block header information, mark the cellular base station broadcasting the block identification information as a malicious cellular base station; if the calculated first Merkle tree root is consistent with the saved second Merkle tree root, continue to verify the block corresponding to the block identification information, and determine whether the depth of the block is not less than the verification threshold; if the depth of the block is not greater than the verification threshold, mark the cellular base station broadcasting the block identification information as a malicious invalid base station; and if the depth of the block is not less than the verification threshold, determine that the block containing the master information block is available, and confirm that the cellular base station broadcasting the block identification information is a cellular base station to be accessed, while the physical downlink shared channel can also be detected to obtain SIB1.

Figure 6:
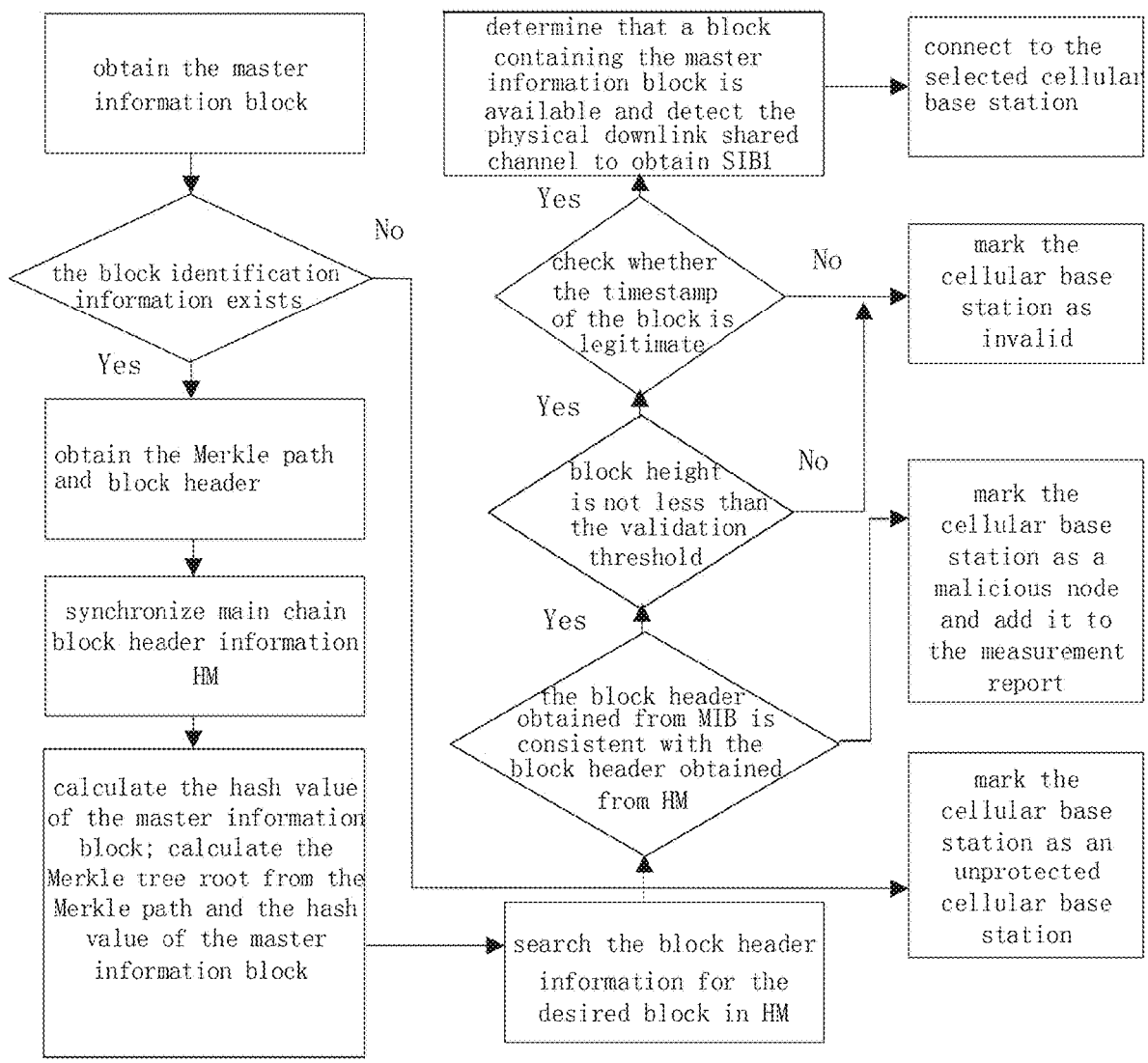
FIG. 6 is a flowchart of the verification process for determining the cellular base station to be accessed in an embodiment of the present disclosure.

In one or more embodiments of the present disclosure, as shown in FIG. 6, the cellular user still verifies the block identification information:

After obtaining the master information block, first determine whether the block identification information exists; examine the master information block and the block identification information to determine whether the block identification information exists; if the block identification information does not exist, mark the cellular base station broadcasting the master information block as an unprotected cellular base station; if the block identification information exists, obtain the Merkle path and block header information from the block identification information; calculate the hash value of the master information block, and calculate the first Merkle tree root based on the hash value of the master information block and the Merkle path; synchronize the main chain block header information and search for the block header information corresponding to the block identification information in the synchronized main chain block header information; if the calculated first Merkle tree root is inconsistent with the second Merkle tree root in the saved main chain block header information, mark the cellular base station broadcasting the block identification information as a malicious cellular base station; if the calculated first Merkle tree root is consistent with the second Merkle tree root in the saved main chain block header information, continue to verify the timestamp of the block identification information and determine whether the timestamp is legitimate; if the timestamp is illegitimate, mark the cellular base station broadcasting the block identification information as an invalid cellular base station, if the timestamp is legitimate, continue to verify the block corresponding to the block identification information and determine whether the depth of the block is not less than the verification threshold; if the depth of the block is less than the verification threshold, mark the cellular base station broadcasting the block identification information as a malicious invalid base station; and if the depth of the block is not less than the verification threshold, determine that the block containing the master information block is available and confirm that the cellular base station broadcasting the block identification information is a cellular base station to be accessed.

It can be understood that after the cellular user receives the master information block and block identification information broadcasted by the cellular base station, the user can obtain the scheduling information of the main chain block header information from the master information block, then synchronize the main chain block header information, and prepare for subsequent verification of the block depth information, Merkle tree root, and timestamp corresponding to the block identification information; at the same time, parse the block identification information to obtain the timestamp, block header information, and the Merkle path containing the master information block.

At 303, performing uplink synchronization with the cellular base station to be accessed based on a random access procedure.

In the embodiment of the present disclosure, the cellular base station that receives the access request from the cellular user, which is also the cellular base station to be accessed by the cellular user, responds to the access request and performs uplink synchronization with the cellular user that sends the access request based on the random access procedure. The trusted access process in the embodiment of the present disclosure includes:

The cellular user obtains the cell identifier, the master information block, and verifies the block identification information. The cellular user verifies the master information block based on the block identification information. The cellular user performs downlink synchronization. The cellular user obtains the time-frequency domain position of SIB1. The cellular user obtains the required random access information from SIB1. And the cellular user executes the random access procedure through the uplink.

The cellular user and the cellular base station carry out the subsequent initial access process.

In one or more embodiments of the present disclosure, the cellular user that sends the access request can obtain random access procedure information (such as uplink frequency and physical random channel configuration) through SIB1 and implement uplink synchronization through the random access procedure. Then, the initial registration process is initiated. For the current R16 version protocol, considering the standalone networking scenario targeted in this embodiment, a two-step random access scheme can be adopted. The first step includes uplink MSGA transmission, which contains preamble and payload, and requires sending the MsgA preamble first, followed by the MsgA payload. The second step of the two-step random access is the downlink MSGB transmission (sent from the base station to the user), which includes MsgB PDCCH and MsgB PDSCH. If MsgB is not received within the MsgB Response Window, MsgA is retransmitted.

It can be understood that uplink synchronization with the cellular base station to be accessed based on the random access procedure is a conventional technical means adopted by those skilled in the art. The present disclosure does not specifically limit this, and the above embodiment is just a reference and not a limitation of the present disclosure. Those skilled in the art can carry out the random access procedure and uplink synchronization process according to the actual situation.

Figure 7:
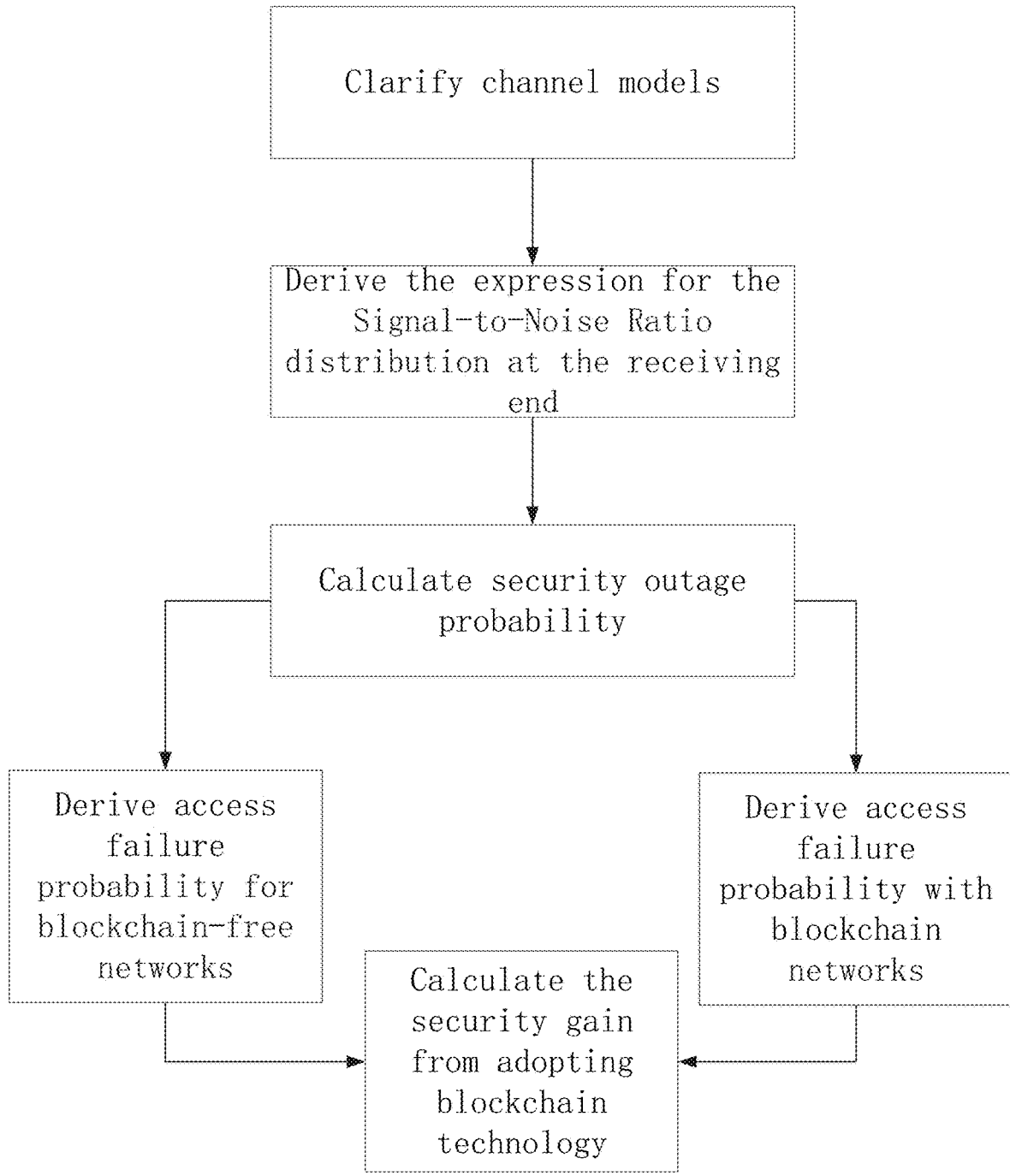
FIG. 7 is a flowchart of the decentralized trusted access method for a cellular base station in one or more embodiments of the present disclosure.

FIG. 7 is a flowchart of a decentralized trusted access method for a cellular base station in one or more embodiments of the present disclosure. As shown in FIG. 7, the trusted access method in the above embodiment can be optimized, and the optimization process includes:

Clarifying the channel model; in terms of blockchain-enhanced system information security effectiveness proof and corresponding implementation, the channel model is optional. This embodiment takes the Rayleigh channel as an example for implementation.

Based on the channel model, the expression for the Signal-to-Noise Ratio (SNR) distribution at the receiving end can be obtained, the Cumulative Distribution Function (CDF) of the SNR $\gamma_n$ of the legitimate base station signal received at the cellular user equipment (UE) is $F_{\gamma_u}(\gamma)=1-\Gamma(N,\sigma_u^2(p_g^{tran})^{-1}\gamma)(\Gamma(N))^{-1}$, the CDF of the SNR $\gamma_e$ of the legitimate base station signal received at the False Base Station (FBS) is $F_{\gamma_e}(\gamma)=1-\Gamma(N,\sigma_f^2(p_g^{tran})^{-1}\gamma)(\Gamma(N))^{-1}$, and the CDF of the SNR $\gamma_f$ of the FBS signal received at the UE is $F_{\gamma_f}(\gamma)=1-\exp\{-\sigma_f^2(p_f^{tran})^{-1}\gamma\}$. Here, $p_f^{tran}$ and $p_g^{tran}$ represent the transmission power of the FBS and the legitimate cellular base station, respectively, N represents the number of transmitting antennas of the cellular base station, $\sigma_u^2$ and $\sigma_f^2$ represent the Gaussian white noise variance at the UE and at the FBS, respectively, $\Gamma(\cdot)$ represents the gamma function, and $\Gamma(\cdot,\cdot)$ represents the upper incomplete gamma function.

Calculating the outage probability; in the outage probability calculation step, this embodiment calculates the outage probability based on the Wyner eavesdropping model. The outage probability in the blockchain scenario is $P_{so}^b=1-F_{\gamma_e}(2^{R_e^b}-1)$ and the outage probability in the traditional non-blockchain scenario is $P_{so}=1-F_{\gamma_e}(2^{R_e}-1)$, where $R_e^b$ and $R_e$ represent the secrecy redundancy rates in the scenarios with/without blockchain, respectively.

Therefore, the probability of UE accessing the false base station in the blockchain scenario, which is also the access failure probability obtained using the access method of the present disclosure, is: $P_f^b=P_{so}^b \times P_d \times P_e^b$, where $P_e^b=[1-F_{\gamma_f}(2^{R_f^b}-1)]F_{\gamma_e}(2^{R_f^b}-1)$ represents the probability that the FBS signal quality is higher than that of the legitimate cellular base station, $R_f^b$ is the transmission rate of the FBS sending signals to the UE; $P_d$ is the probability of a successful double-spending attack initiated by the FBS constructing a forked chain based on the latest block of the main chain, expressed as:

$$P_d = 1 - \sum_{n=0}^{z}\binom{n+z-1}{z-1}p^z q^n \times \begin{cases} [(q/p)^{z-n+1}-1](q/p)^{-M} & p \neq q \\ (z-n+1)M^{-1} & p = q \end{cases}$$

where $z$ is the block depth confirmation threshold, i.e., when a block is confirmed by $z$ subsequent blocks, the block is considered valid; q and pP represent the probabilities of the FBS and gNB creating new blocks, respectively, i.e., the respective computing power ratios of the total computing power, p+q=1; $\lambda = \bar{z}$ qp$^{-1}$ is the expected number of, blocks created by the FBS, and M is the maximum number of blocks behind the main chain that the FBS can accept.

In the non-blockchain scenario, the probability of UE accessing the false base station, which is also the access failure probability obtained using the traditional access method after pre-calculation, is: $P_f = P_{so} \times P_e$; where $P_e = \int_0^\infty f_{\gamma_f}(\gamma) F_{\gamma_u}(\gamma) d\gamma$ represents the probability that the FBS signal quality is higher than that of the legitimate cellular base station. Therefore, based on the aforementioned definitions and calculations of $P_f^b$ and $P_f$, the security gain SG=$(1-P_f^b)(1-P_f)^{-1}$ can be calculated.

According to the security gain, the block threshold for deploying the blockchain network can be determined based on the security requirements of different disclosure scenarios. The block threshold and its updated data can be placed in the master information block for users to obtain. Then, the verification threshold is updated according to the block threshold, that is, in step 302, the cellular user updates the verification threshold for the block depth to which they belong. If the depth of the block is less than the verification threshold, the cellular base station corresponding to the block is marked as a malicious invalid base station. If the depth of the block is not less than the verification threshold, the block is considered available, and the cellular base station broadcasting the corresponding block identification information is determined as the base station to be accessed.

In one or more embodiments of the present disclosure, this embodiment also supports systematic security analysis in the case of multiple base stations. Next, this embodiment calculates the system security gain improved by adopting the blockchain network when the base station and FBS location distribution satisfy the Poisson Point Process (PPP). In the PPP scenario, for the simplicity of formula expression, the symbol u is used to represent the UE, $\lambda_g$ and $\lambda_f$ represent the distribution density of cellular base stations and false base stations, respectively, the cellular base station closest to the u is represented as $g_0$, and the false base station closest to the u is represented as $f_0$. $d_{x,y}$ represents the distance between the receiving end X and the transmitting end y. Based on the aforementioned SG analysis framework, the CDF of the SNR $\tilde{\gamma}_{u, g_0}$ of the legitimate base station signal received at the UE in the PPP scenario is derived as $F_{\tilde{\gamma}_{u, g_0}}(\gamma) = 1 - \int_0^\infty \Xi(\gamma, r) f_{d_{u,g_0}}(r) dr$, the CDF of the SNR $\tilde{\gamma}_{f_0, g_0}$ of the legitimate base station signal received at the FBS is $F_{\tilde{\gamma}_{f_0, g_0}}(\gamma) = 1 - \int_{r>0} \Psi(\gamma, p_s, \sigma_{f_0, g_0}, \lambda_g, r) dr$ and the CDF of the SNR $\tilde{\gamma}_{u, f_0}$ of the FBS signal received at the UE is $F_{\tilde{\gamma}_{u, f_0}}(\gamma) = 1 - \int_{r>0} \Psi(\gamma, p_f, \sigma_{u, f_0}, \lambda_f, r) dr$, and the probability density function of $\gamma_{u, f_0}$ can be obtained as $f_{\tilde{\gamma}_{u, f_0}}(\gamma) = \int_{r>0} \xi(\gamma, r) \Psi(\gamma, p_f^{tran}, \sigma_{u}, \lambda_f, r) dr$. Therefore, based on the aforementioned SG definition, the security gain in the PPP scenario can be obtained. The definitions of the various functions involved are:

$$\Psi(\omega, \vartheta, \kappa, \delta, r) = \exp\left\{-\omega\kappa^2 r^\tau \vartheta^{-1} - \pi\lambda_g r^2 \left[\omega^{2\tau^{-1}} E\left[(v_i)^{2\tau^{-1}}\right] \Gamma(1 - 2\tau^{-1}) - H_{2\tau^{-1}}(\omega)\right]\right\} 2\pi\delta r e^{-\pi r^2 \delta}$$

$$H_{2\tau^{-1}}(\gamma) = 1 - 2(\tau N + 2)^{-1} \gamma^{-N_I} \times_2 F_1(N_I, N_I + 2\tau^{-1}, 1 + N_I + 2\tau^{-1}, -\gamma^{-1})$$

$$\xi(\gamma, r) = \sigma_{f_0, u}^2 r^\tau (p_f^{tran})^1 +$$

-continued
$$2\pi\lambda_g r^2 \tau^{-1} \gamma^{2\tau^{-1}-1} E\left[(v_i)^{2\tau^{-1}}\right] \Gamma(1 - 2\tau^{-1}) - \pi\lambda_g r^2 J'(\gamma)$$

$$J'(\gamma) = 2N_I(\tau N, +2)^{-1} \gamma^{-N_I - 1} \times_2 F_1(N_I, N_I + 2\tau^{-1}, 1 + N_I + 2\tau^{-1}, -(\gamma)^{-1}) - 2(\tau N_I + 2)^{-1} \gamma^{-N_I - 2}(N + 2\tau^{-1})(1 + N_I + 2\tau^{-1})^{-1} {}_2F_1(N_I + 1, N_I + 2\tau^{-1} + 1, 2 + N_I + 2\tau^{-1}, -(\gamma)^{-1})$$

where $E(\cdot)$ represents the mathematical expectation, ${}_2F_1(\cdot)$ represents the Gaussian hypergeometric function, $\tau$ is the path loss exponent, $V_i$ represents the channel gain between the interfering cellular base station i and u, and $N_I$ represents the number of transmitting antennas of the interfering base station.

It should be understood that in this embodiment, the probability of a user determining the FBS as the base station to be accessed is defined as the access failure probability. In this embodiment, by comparing the access failure probability calculated in the present disclosure example with the access failure probability in traditional technology without using a blockchain network, the security gain SG of the blockchain network in the present disclosure example is calculated. The block threshold for deploying the blockchain network is updated according to the security gain, and the verification threshold is updated according to the block threshold, making the benefits of the decentralized trust method based on cellular base stations more optimal.

Although the embodiments of the present disclosure have been shown and described, it will be understood by those skilled in the art that various changes, modifications, substitutions, and alterations can be made to these embodiments without departing from the principles and spirit of the present disclosure. The scope of the present disclosure is defined by the appended claims and their equivalents.

The invention claimed is:

1. A decentralized trusted access method for a cellular base station, applied to the cellular base station, the method comprising:

uploading registration information to a blockchain network, wherein the registration information comprises a public key pair and a certificate of the cellular base station; and based on the public key pair and the certificate, adding the cellular base station as a member to the blockchain network;

uploading a master information block to the blockchain network, wherein the master information block is used to indicate basic information required for cellular users within a coverage area of the cellular base station to access the cellular base station;

authenticating, by the blockchain network, the master information block, wherein if the authentication is successful, packaging the master information block into a block, otherwise discarding it;

executing, by nodes in the blockchain network, a consensus algorithm on the block, wherein when consensus is reached among the nodes, storing the block on the chain and generating block identification information for the block, the block identification information comprising block header information of the block in which the master information block is located and a Merkle path containing the master information block;

receiving block identification information from the blockchain network, wherein the block identification information is generated by executing a consensus algorithm on the block, and after satisfying consensus algorithm conditions, storing the block on the chain; the block is a data block formed by packaging after authenticating the master information block by the blockchain network;

broadcasting the master information block and the block identification information to cellular users within the coverage area;

receiving an access request from the cellular user, wherein the access request comprises the cellular base station to be accessed as determined by the cellular user based on the master information block and the block identification information; and in response to the access request, performing uplink synchronization with the cellular user issuing the access request based on a random access procedure.

2. A decentralized trusted access method for a cellular base station, applied to a blockchain network, the method comprising:

receiving registration information uploaded by the cellular base station, wherein the registration information comprises a public key pair and a certificate of the cellular base station;

in response to the public key pair and the certificate, performing registration processing for the cellular base station to add the cellular base station as a member to the blockchain network;

receiving master information block uploaded by the cellular base station, the master information block is used to indicate the basic information required for cellular users within a coverage area of the cellular base station to access the cellular base station;

in response to the master information block, forming a block by packaging after authenticating the master information block; executing a consensus algorithm on the block, after satisfying consensus algorithm conditions, storing the block on the chain and generating block identification information; and returning the block identification information to the cellular base station for the cellular base station to broadcast the master information block and the block identification information to cellular users within the coverage area, allowing the cellular users within the coverage area to determine the cellular base station to be accessed based on the master information block and the block identification information, and performing uplink synchronization with the cellular base station to be accessed based on a random access procedure, wherein, forming a block by packaging after authenticating the master information block; executing a consensus algorithm on the block, after satisfying consensus algorithm conditions, storing the block on the chain and generating block identification information, comprises:

in response to the master information block, verifying the master information block, and if the authentication is successful, packaging it into a block, otherwise discarding it; and executing the consensus algorithm on the block, and when consensus is reached among nodes in the blockchain network, storing the block on the chain and generating the block identification information for the block; and the block identification information comprising block header information of the block of the master information block and the Merkle path containing the master information block.

3. The decentralized trusted access method for a cellular base station of claim 2, wherein performing registration processing for the cellular base station to add the cellular base station as a member to the blockchain network comprises:

parsing the registration information of the cellular base station to obtain identity information of the cellular base station; verifying the identity information of the cellular base station according to a device manufacturer root certificate and a device manufacturer signature certificate, if the verification is successful, issuing a registration certificate to the cellular base station and returning a certificate response to the cellular base station, and adding the cellular base station as a member to the blockchain network; otherwise, refusing the cellular base station to become a member of the blockchain network.

4. A decentralized trusted access method for a cellular base station, applied to a cellular user, the method comprising:

acquiring a master information block and block identification information broadcast by the cellular base station, and verifying the block identification information; the master information block is used to indicate the basic information required for cellular users within a coverage area of the cellular base station to access the cellular base station; the block identification information is generated by executing a consensus algorithm on the block, and after satisfying consensus algorithm conditions, storing the block on the chain; the block is a data block formed by packaging after authenticating the master information block by the blockchain network;

if the block identification information exists, verifying the block identification information, if the verification of the block identification information is successful, continuing to verify the block corresponding to the block identification information, if the verification of the block is successful, determining the cellular base station as the base station to be accessed; and performing uplink synchronization with the cellular base station to be accessed based on a random access procedure, wherein, during the process of verifying the block identification information, if the verification of the block identification information is successful, continuing to verify the block corresponding to the block identification information, verification conditions used comprise:

verifying if a first Merkle tree root calculated by the block identification information is consistent with a second Merkle tree root in the stored block in the blockchain network; verifying if a timestamp of the block identification information is legitimate, or if a timestamp of the block corresponding to the block identification information is legitimate; and verifying if a block depth of the block corresponding to the block identification information is not less than a verification threshold.

5. The decentralized trusted access method for a cellular base station of claim 4, wherein, verifying if a first Merkle tree root calculated by the block identification information is consistent with a second Merkle tree root in the stored block in the blockchain network comprises:

obtaining a Merkle path and block header information from the block identification information; calculating a hash value of the master information block and calculating the first Merkle tree root based on the hash value of the master information block and the Merkle path; synchronizing a main chain block header information and searching the block header information corresponding to the block identification information in the synchronized main chain block header information; obtaining the second Merkle tree root through the saved main chain block header information; and comparing the first Merkle tree root with the second Merkle tree root, and if they are not consistent, marking the cellular base station broadcasting the block identification information as a malicious cellular base station.

6. The decentralized trusted access method for a cellular base station of claim 5, wherein, verifying if a timestamp of the block identification information is legitimate, or if a timestamp of the block corresponding to the block identification information is legitimate comprises:

before verifying if the block depth of the block corresponding to the block identification information is not less than the verification threshold, verifying if the timestamp of the block identification information is legitimate, if the timestamp of the block identification information is not legitimate, marking the cellular base station broadcasting the block identification information as an invalid cellular base station; after verifying if the first Merkle tree root calculated by the block identification information is consistent with the second Merkle tree root in the stored block in the blockchain network, verifying if the timestamp of the block corresponding to the block identification information is legitimate, and if the timestamp of the block is not legitimate, marking the cellular base station broadcasting the block identification information as an invalid cellular base station.

7. The decentralized trusted access method for a cellular base station of claim 5, wherein, verifying if the block depth of the block corresponding to the block identification information is not less than the verification threshold comprises:

if the block depth of the block being less than the verification threshold, marking the cellular base station broadcasting the block identification information as a malicious invalid base station; and if the block depth of the block being not less than the verification threshold, marking the cellular base station broadcasting the block identification information as a cellular base station to be accessed.

8. The decentralized trusted access method for a cellular base station of claim 7, wherein, the method further comprises:

defining a probability of the cellular user determining a false base station as a cellular base station to be accessed as an access failure probability; calculating the access failure probability of the cellular user; comparing the calculated access failure probability with a pre-calculated access failure probability, and calculating a security gain of the blockchain network; deploying a block threshold of the blockchain network based on the security gain, and updating the verification threshold of the block depth in the blockchain network.

* * * * *